US011350624B2

(12) United States Patent
Shapiro et al.

(10) Patent No.: US 11,350,624 B2
(45) Date of Patent: Jun. 7, 2022

(54) PORTABLE THERMAL INSECT REPELLENT SYSTEM

(71) Applicant: Thermacell Repellents, Inc., Bedford, MA (US)

(72) Inventors: Stephen J. Shapiro, Bedford, MA (US); Charles A. Laughlin, Bedford, MA (US); Adam A. Chojnacki, Bedford, MA (US); Jake M. Donnelly, Bedford, MA (US)

(73) Assignee: Thermacell Repellents, Inc., Bedford, MA (US)

( * ) Notice: Subject to any disclaimer, the term of this patent is extended or adjusted under 35 U.S.C. 154(b) by 152 days.

(21) Appl. No.: 16/027,766

(22) Filed: Jul. 5, 2018

(65) Prior Publication Data

US 2019/0008137 A1    Jan. 10, 2019

Related U.S. Application Data

(60) Provisional application No. 62/529,193, filed on Jul. 6, 2017.

(51) Int. Cl.
*A01M 29/12* (2011.01)
*A01M 1/20* (2006.01)

(52) U.S. Cl.
CPC .......... *A01M 29/12* (2013.01); *A01M 1/2044* (2013.01); *A01M 1/2061* (2013.01); *A01M 1/2072* (2013.01); *A01M 1/2077* (2013.01)

(58) Field of Classification Search
CPC .............. A01M 1/2044; A01M 1/2077; A01M 1/2022; A01M 1/2061; A01M 1/2066; A01M 29/12; A01M 13/00; A01M 2200/01; A61L 9/127; A61L 9/12; A61L 9/037; F23D 3/24; B41J 2/17503; B41J 2/17513;

(Continued)

(56) References Cited

U.S. PATENT DOCUMENTS 4,621,768 A * 11/1986 Lhoste ..................... A61L 9/127
239/44
6,478,440 B1 * 11/2002 Jaworski ............. F21V 23/0442
362/802

(Continued)

FOREIGN PATENT DOCUMENTS

KR    10-1996-0009481    7/1996

OTHER PUBLICATIONS

Extended European Search Report dated Feb. 19, 2021, EP18828374.1 (ref. PCT/US2018/040891).

*Primary Examiner* — John J Norton
(74) *Attorney, Agent, or Firm* — MacMillan, Sobanski & Todd, LLC

(57) ABSTRACT

An evaporator is provided, for use with a wicked reservoir containing a volatile liquid. The reservoir has a plurality of guide members disposed symmetrically around the wick and extending beyond the height of the wick. The evaporator features a base containing a battery, and a removable cover containing a heater. Attachment of the cover to the base is necessary to establish an electrical connection between the battery and the heater. The guide members fit into recesses in the cover only when the heater and wick are properly aligned, and the heater cannot make electrical connection with the battery unless the guide members and wick are properly aligned with the recesses and heater, respectively.

14 Claims, 6 Drawing Sheets

(58) Field of Classification Search
CPC .. B41J 2/17553; B41J 2/1752; B41J 2/17509;
B41J 2/1753; B41J 29/13; B41J 2/17506;
B41J 2/1754; B41J 2/17543; B41J
2002/14491; B41J 2/17536; B41J 2/1404;
B41J 11/00244; B41J 2/05; B41J 2/145;
B41J 2/1652; B41J 2/1755
USPC ....... 392/322, 338, 313, 324, 447, 445, 461,
392/318, 342, 347, 378, 386, 394, 450,
392/452, 477, 501; 219/523, 432, 481,
219/522, 494, 507, 756; 122/15.1, 13.3;
439/620.21, 919
See application file for complete search history.

(56) References Cited

U.S. PATENT DOCUMENTS

| | | | | |
|---|---|---|---|---|
| 6,742,444 B1* | 6/2004 | Lai | ...................... | A47J 37/1209 |
| | | | | 219/430 |
| 7,959,132 B2 | 6/2011 | Butler | | |
| 2002/0066967 A1* | 6/2002 | Bartsch | ................... | A61L 9/042 |
| | | | | 261/26 |
| 2002/0166853 A1* | 11/2002 | Basaganas Millan | ....................... | |
| | | | | A01M 1/2077 |
| | | | | 219/229 |
| 2002/0181946 A1* | 12/2002 | Brown | ................ | A01M 1/2077 |
| | | | | 392/390 |
| 2004/0145067 A1* | 7/2004 | Millan | ................ | A01M 1/2077 |
| | | | | 261/142 |
| 2005/0112163 A1 | 5/2005 | Nishimura et al. | | |
| 2008/0056691 A1* | 3/2008 | Wingo | .................... | A61L 9/122 |
| | | | | 222/23 |
| 2009/0196586 A1* | 8/2009 | Hasik | .................. | A01M 1/2077 |
| | | | | 392/394 |
| 2010/0051598 A1* | 3/2010 | Butler | ..................... | A61L 9/037 |
| | | | | 219/209 |
| 2013/0114244 A1* | 5/2013 | Formico | ................ | F21V 33/006 |
| | | | | 29/469 |
| 2014/0362560 A1* | 12/2014 | Formico | ................ | F21V 15/01 |
| | | | | 239/302 |
| 2017/0072084 A1* | 3/2017 | Gruenbacher | ...... | B01F 3/04085 |
| 2017/0072085 A1* | 3/2017 | Gruenbacher | .......... | A61L 9/127 |
| 2017/0099877 A1* | 4/2017 | Worm | .................. | A61M 11/042 |
| 2019/0281810 A1* | 9/2019 | Sinur | ................... | A01M 29/12 |

* cited by examiner

PORTABLE THERMAL INSECT REPELLENT SYSTEM

REFERENCE TO PRIOR APPLICATIONS

This application claims priority of U.S. provisional application No. 62/529,193, filed on Jul. 6, 2017, which is incorporated herein by reference in its entirety.

FIELD OF THE INVENTION

This invention relates to devices for dispensing volatile substances for repelling insects.

BACKGROUND OF THE INVENTION

Hunters, campers, hikers and backpackers, and suburbanites trying to enjoy their backyards and patios, are frequently subject to attack by mosquitos, black flies, and other biting insects. Insect repellants and insecticides are among the most common weapons employed against such attacks. The prior art discloses devices which utilize a fuel canister to supply fuel to burners, which in turn heat and vaporize an insect repellent or insecticide composition. Representative devices are described in U.S. Pat. Nos. 4,699,123, 5,700,430 and 9,497,958, and references therein. The entire contents of each of these prior patents are incorporated herein by reference, for all purposes.

The devices described in the above patents employ an inert, porous mat which is impregnated with the repellent or insecticidal composition also referred to as active ingredient or volatiles. The mat rests on a heating plate, and serves as a reservoir for the composition as it is gradually volatilized by the applied heat. The devices are accordingly limited in the amount of repellent or insecticide available for use, because of the finite amount of material that can be impregnated into a single mat. The gas canisters also present a problem for passengers traveling by air, since airlines generally forbid the carrying of compressed gases on passenger aircraft.

There is thus a need for devices with a higher capacity for volatiles, which would offer both extended operating times and less physical waste in order to reduce waste and to enable a user to travel with the device by air. One alternative to heated mats is a wick-based volatilization system, in which a reservoir of liquid volatiles of arbitrary size can be provided. A porous wick within the reservoir absorbs the liquid, which is carried by capillary action to an evaporation zone, which may be heated to an appropriate degree. Representative examples of this latter technology, which is commonly employed in the manufacture of indoor air fresheners, can be found in U.S. Pat. Nos. 4,913,350, 5,591,395, 6,123,935, 6,917,754, 6,931,202, and references therein. The entire contents of each of these patents are incorporated herein by reference for all purposes.

BRIEF DESCRIPTION

The device of the present invention is an evaporator which employs a reservoir of volatile liquid insect repellent and/or insecticide (referred to herein as "volatiles"), a wick to carry the liquid to an evaporation zone, and an electric heater proximate to the wick in the evaporation zone. A battery is connected to and energizes the heater under appropriate controls.

The device has at least two configurations, an open configuration in which the user is able to remove and/or install a reservoir, and a closed or operating configuration in which the reservoir is locked into place with the wick centered in the heater. The wick is preferably built into the reservoir, so that the user has the convenience of removing and installing only a single item. A reversibly detachable cap protects the wick and seals the reservoir during transport and storage and may be replaced whenever the reservoir is removed from the device.

In preferred embodiments, the reservoir is shaped so as to fit in a complimentary recess within the device, the fit being sufficiently precise to ensure that the wick is centered in the heater when the device is put into the operating configuration. Improper placement of the reservoir, and the absence of a reservoir, is preferably detected through electrical or mechanical interlocks, which prevent the device from being placed in the operative configuration and prevent the heater from being energized until the reservoir is properly inserted. The reservoir is also preferably shaped or modified so as to at least partially surround the wick, shielding the wick from physical damage.

The device features an on/off switch for convenient operation of the heater, and preferably also features a multi-position switch. The multi-position switch enables a "locked off" mode, in which accidental activation of the on/off switch does not activate the heater; an "on mode" in which the on/off switch activates the heater; and a "timer mode" in which pressing the on/off switch initiates a timed run.

An aspect of the present invention is the ability to accurately control the current flowing to the heating element, so as to create a temperature in the evaporation zone that is high enough to evaporate the volatiles at a rate that maintains an effective and consistent concentration of the volatiles in the surrounding air. The effective control of power is an important safety aspect as well as a performance feature of the device, because the user is generally unable to judge what constitutes an appropriate rate of release of the volatiles. Excessive heating, beyond the optimal temperature, wastes energy and will drain the battery prematurely. The device of the present invention provides the required control, while providing the user with the simplicity and convenience of on/off operation.

The device of the present invention also features a chimney, which establishes a convective air flow that actively carries the volatilized material upward and away from the device. This air flow helps to minimize losses of material due to condensation on cooler portions of the apparatus and enhances the operation of the device.

BRIEF DESCRIPTION OF THE DRAWINGS

The evaporator of the invention is shown in greater detail in the illustrative drawings, of which.

DETAILED DESCRIPTION

Most broadly described, the invention provides a portable, battery-powered evaporator 8 for the thermal evaporation of volatile materials from a wicked reservoir. The use of electrical energy permits rapid and accurate control over the rate of volatilization.

More particularly, the invention provides an evaporator for use with a removable and replaceable reservoir containing a volatile liquid. The reservoir has disposed therein a wick that has a lower portion in contact with the volatile liquid, and an upper portion protruding from the reservoir. The evaporator typically comprises the following elements: (1) a base having a first recess, within which the reservoir closely fits; (2) a battery housed within the base; and (3) a cover, within which is a cylindrical heater.

The cover is closeable upon (or fastenable to) the base, and when it is closed or fastened to the base, a functional electrical connection is established between the battery and the heater. As used herein, "establishing a functional electrical connection" encompasses both the direct creation of a conductive path between the heater and the battery through an electrical junction, for example via a plug in the cover mating with a complementary socket in the base, and the indirect making of the connection, for example by closing a switch that permits current to flow between the battery and the heater.

The reservoir has two or more protruding guide members, which are disposed more or less symmetrically around the wick and which extend vertically beyond the height of the wick. The guide members fit closely within complementary guide recesses within the cover, and when the guide members are fitted within these guide recesses, the relative positions of the reservoir and cover become fixed, so that the wick is centrally disposed within the heater. If the guide members are not fitted into the guide recesses, the cover cannot be properly aligned with the reservoir and/or the base, and it cannot be closed upon or fastened to the base.

When the cover is closed upon or fastened to the base, a functional electrical connection between the heater and the battery is established, but this can happen only if the cover and reservoir are correctly aligned, and the wick is centrally disposed within the heater. Conversely, if the wick is not centrally disposed within the heater, a functional electrical connection cannot be established.

Figure 1:
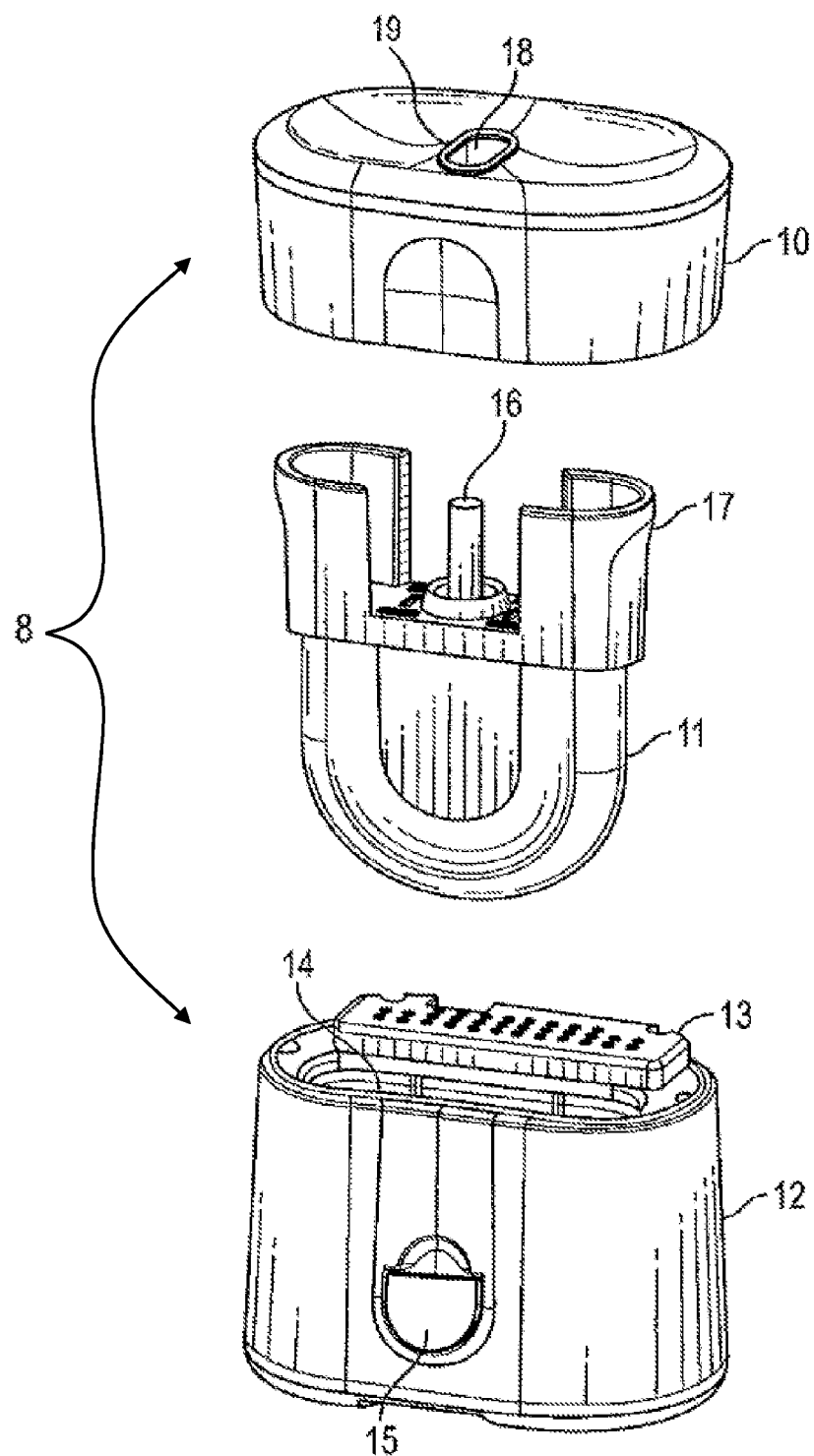
FIG. 1 is a perspective drawing of one embodiment of the invention, showing the cover, reservoir, and base of the device.

The drawings show a particular embodiment of the present invention. FIG. 1 shows a perspective view of the three main components, in a representative embodiment of the invention. Base 12 contains the battery 13 and features a recess 14 into which reservoir 11 fits closely. On/off switch 15 is located for convenience on the front of the base. Installed in reservoir 11 is a wick 16 that extends into the interior of the reservoir (not shown). Liquid volatiles contained within the reservoir are conducted by capillary action out of the reservoir and to the upper end of the wick 16. The reservoir is otherwise sealed, which prevents the user from coming into contact with the liquid contents, which are severely irritating to the skin. The liquid contents are also strong organic solvents, and the sealed reservoir prevents spillage or leakage, and the resulting damage to finished surfaces and plastic objects.

The reservoir in this embodiment features wings 17 that extend vertically past the wick 16. The wings 17 serve to protect the wick from impact and physical damage, and by fitting closely within guide recesses in cover 10, the wings also serve as guide members, to align the reservoir with the heater (see below), so that wick 16 is centered within the heater cylinder. The reservoir features a rounded bottom, into which the wick is fully extended, so as to minimize residual, unused fluid when the reservoir is exhausted. The cover 10, which contains the heater, fits over the top of the reservoir and the wick. Chimney 18 is disposed in the center of the cover, and serves to conduct volatilized material out of the evaporation zone and into the surrounding air. The chimney is preferably surmounted by a raised rim 19, which extends a small distance (on the order of 0.5 to 2.0 mm) above the upper surface of cover 10. The raised rim serves to minimize contact of the heated and volatilized material with the surface of the cover, thereby preventing or minimizing cooling and condensation of the volatile materials onto the cover. The curved surface of the cover, in the embodiment shown, further aids in preventing condensation, by increasing the effective height of the chimney opening above the surface.

Figure 2:
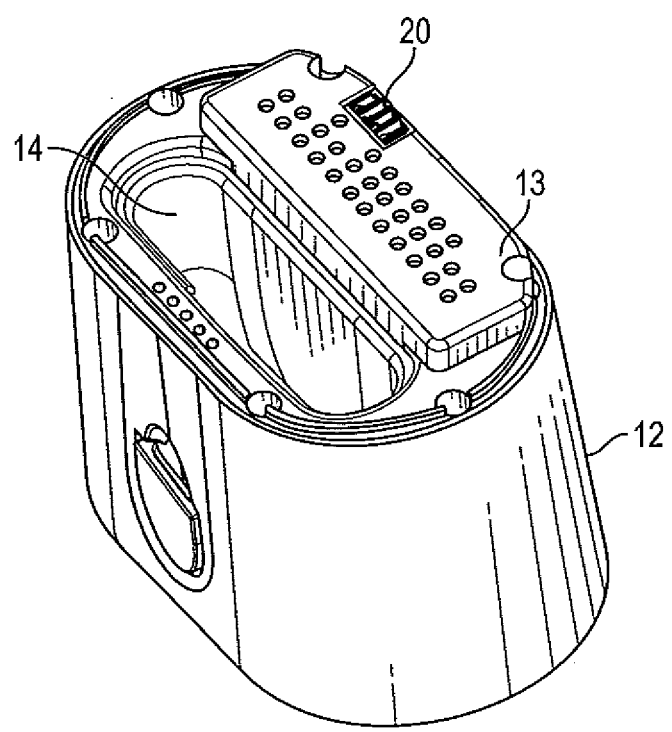
FIG. 2 is perspective drawing of the base from FIG. 1, from a higher angle.

FIG. 2 is a perspective view of the base 12, more clearly showing the reservoir recess 14, and also showing electrical junction 20 through which power is transmitted from the battery to the heater, which is located within the cover. The battery may be any suitable type, including disposable batteries, but the most preferred type is a rechargeable lithium-ion battery. Preferably, the battery is rechargeable in situ (without being removed), and the base incorporates appropriate charging electronics. In a preferred embodiment, the charging electronics meet the USB "BC1.1" charging specification, and the device may be recharged via a standard USB dedicated charging port.

Figure 3:
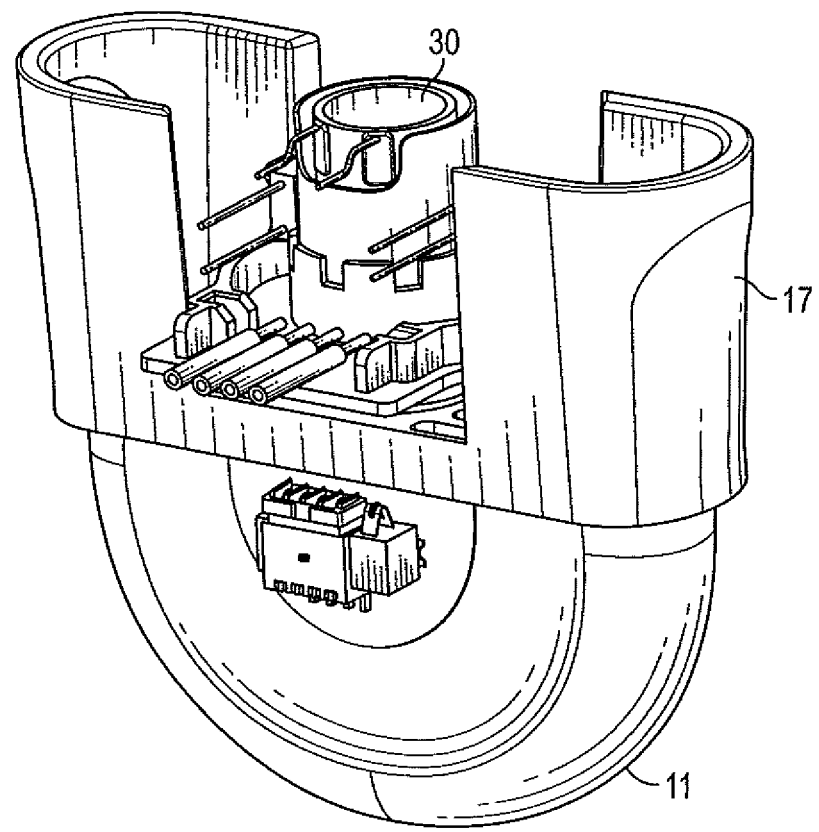
FIG. 3 is a perspective drawing of some of the elements within the cover, showing the heater.

In FIG. 3, some of the components of the heating system located within the cover 10 are shown in operating alignment with the reservoir 11. The central element is the heater cylinder 30, which surrounds the wick and is resistively heated by current from the battery. When the wick is heated to operating temperature, the volatiles in the wick evaporate and pass out through the chimney opening 18. Convection alone is adequate to disperse an effective amount of insect repellant, although an optional fan, also powered by the battery, may be employed if desired. Convection may be enhanced by providing air channels that guide air into the bottom of the heater cylinder 30 and past the wick 16. Temperature control for the heater may be maintained by firmware installed in a microcontroller, and may be effected by responding to feedback from a thermistor. The controller may gradually raise or lower the voltage or current, in an attempt to find a steady state at the target temperature, or in other embodiments the power supplied to the heater may be switched on and off in response to temperature excursions outside of a pre-selected range. In other embodiments, the thermal output can be calculated from the measured power consumption, and the current modulated accordingly, based on a known relationship between power consumption and heater temperature. In some embodiments, the target temperature may be adjusted to different values, in order to facilitate the volatilization of different substances, or in order to modulate the rate of volatilization.

The firmware is preferably programmed to enter a high-current, fast-heating mode whenever the heater is starting from a cold or relatively cool state. By avoiding an extended warm-up period, during which the volatiles are not being evaporated from the wick, the device is rendered more responsive, with less lag between demand and results. The reduction in unproductive heating time also improves the energy efficiency of the device.

Figure 4:
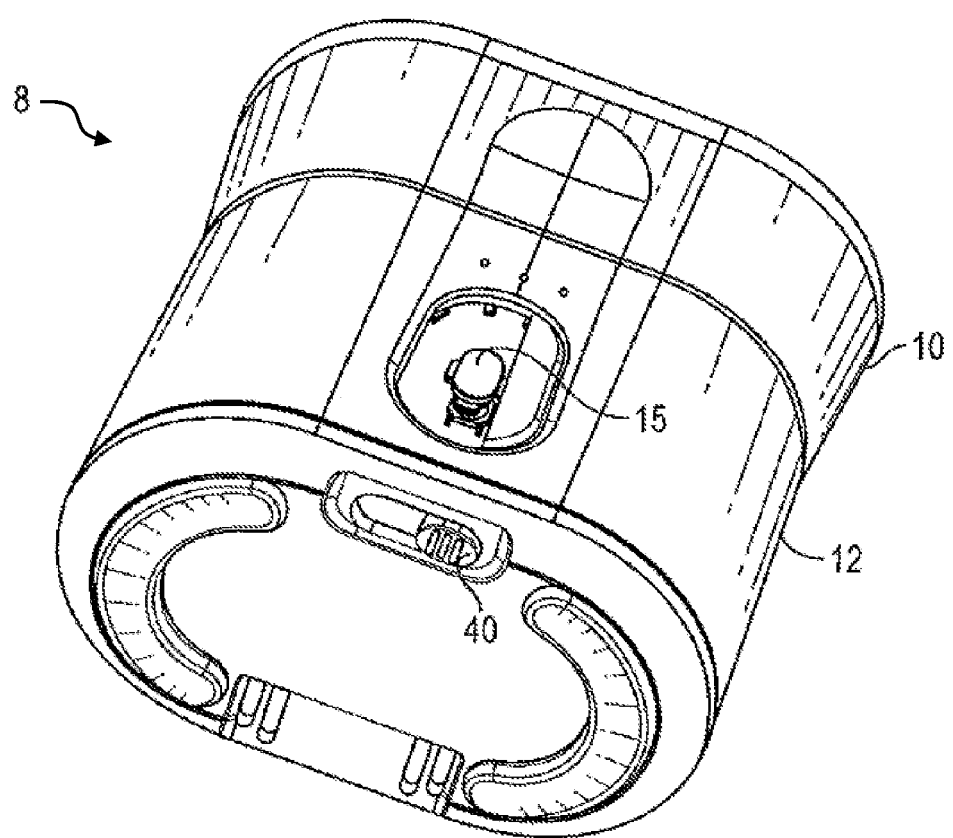
FIG. 4 is bottom perspective drawing of the base from FIG. 1.

FIG. 4 is a bottom perspective view of the evaporator 8 and base 12, showing the multi-position mode switch 40. As noted above, the mode switch enables the device to be put into a "locked off" mode, in which accidental activation of the on/off switch will not activate the heater. A second "on mode" permits the on/off switch to activate and deactivate the heater; and a third "timer mode" enables the device to carry out a pre-programmed timed run, ending with an automatic shutoff. In this mode, pressing the on/off switch initiates a timed run. In some embodiments, the device may permit the user to set the length of a timed run.

Figure 5:
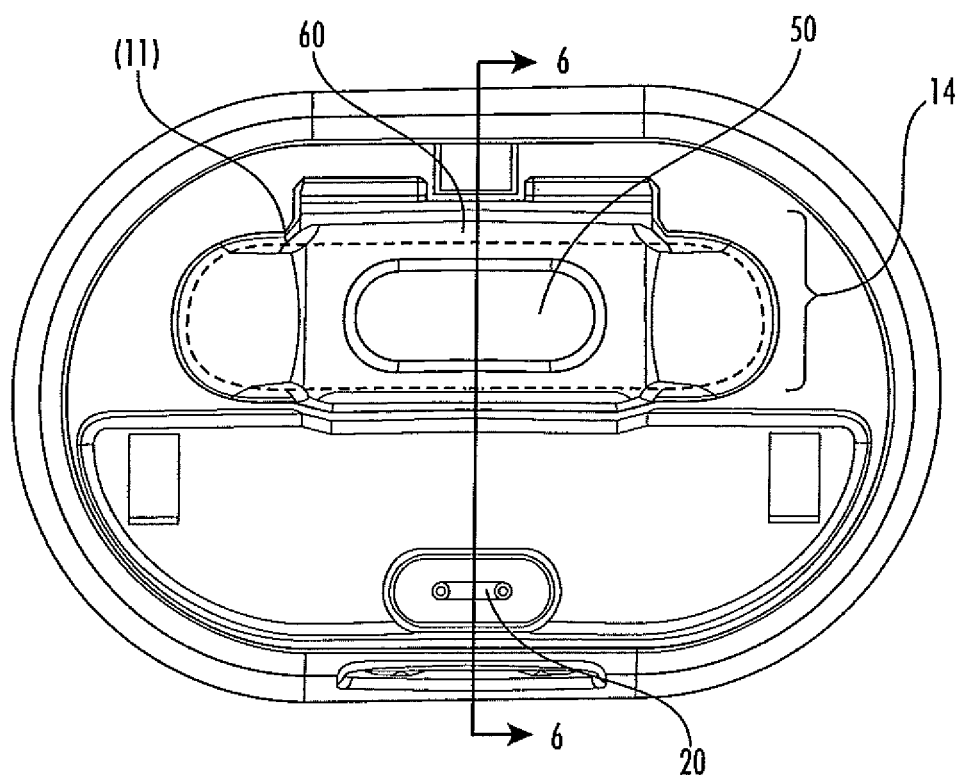
FIG. 5 is a top view of an alternative embodiment of the base of the device.

FIG. 5 is a top view of an alternative embodiment of the base of the device. In this embodiment, an open port 50 is provided at the base of the device. When the device is in operation, air is pulled into the recess 14 of the device through the port 50, driven by convection caused by the heater 30. The position of the reservoir 11, when installed, is shown in dotted lines. The central, rectangular portion of recess 14 has a greater width than the reservoir, which provides an open channel 60 for air to flow upwards past the reservoir 11.

Figure 6:
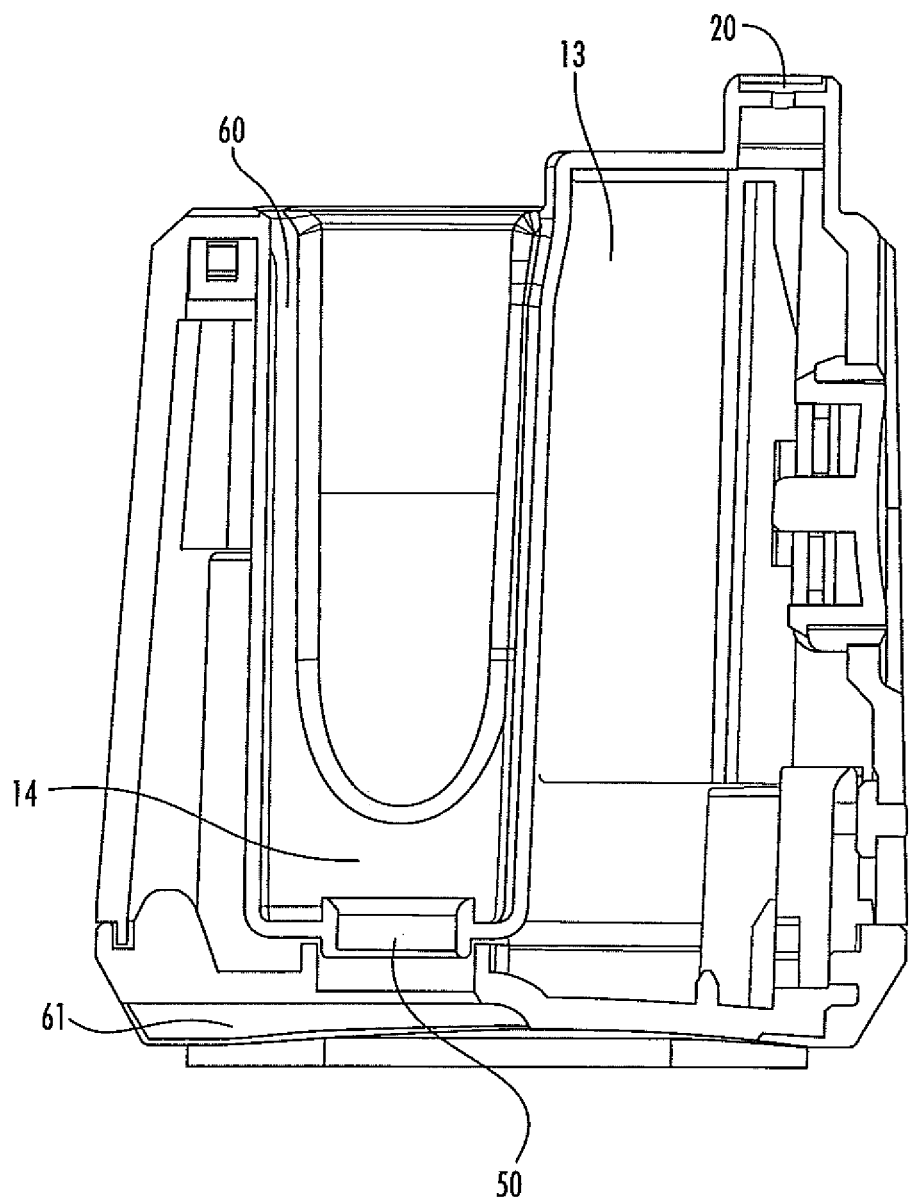
FIG. 6 is a cutaway view of the base from FIG. 5.

FIG. 6 is a cutaway view of the base shown in FIG. 5. The channel 60 may be of any width that permits the passage of air, and is preferably between 1 mm and 10 mm, more preferably between 2 and 5 mm in width, between the sides of the recess 14 and the reservoir 11. In alternative embodiments, two channels, one on either side of the reservoir, may be provided. Clearance area 61 is provided for air to flow under the base and into the port 50.

It should be understood that the preferred embodiment was described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

We claim:

1. An evaporator, for use with a reservoir containing a volatile liquid, the reservoir having disposed therein a wick that has a lower portion in contact with the volatile liquid and an upper portion protruding from the reservoir, the reservoir having a plurality of guide members disposed symmetrically around the wick and extending beyond the upper portion of the wick, the evaporator comprising:
    a base having a first recess defining a complementary structure to at least a portion of the reservoir and configured to receive the reservoir;
    a battery disposed within the base; and
    a cover having disposed therein a cylindrical heater, the cover being closeable upon or fastenable to the base and adapted to establish a functional electrical connection between the battery and the heater when closed upon or fastened to the base, and having an interior within which are disposed a plurality of guide recesses;
    wherein, when the complementary structures of the reservoir and the first recess are aligned and the cover is closed upon or fastened to the base, each of the plurality of guide members is received within one of the plurality of guide recesses and the wick is centrally disposed within the heater; and
    wherein, when the reservoir is inserted into and misaligned relative to the first recess, the guide members prevent the cover from establishing the functional electrical connection between the battery and the heater.

2. The evaporator according to claim 1, wherein closing or fastening the cover to the base creates a conductive path between the heater and the battery.

3. The evaporator according to claim 1, wherein closing or fastening the cover to the base enables operation of a switch that permits current to flow between the battery and the heater.

4. The evaporator according to claim 1, wherein the battery is a disposable battery.

5. The evaporator according to claim 1, wherein the battery is a rechargeable battery.

6. The evaporator according to claim 5, wherein the battery is rechargeable in situ.

7. The evaporator according to claim 1, further comprising a microcontroller and firmware adapted to control the temperature of the heater.

8. The evaporator according to claim 7, wherein the firmware is programmed to enter a fast-heating mode when the heater is started from a cold state.

9. The evaporator according to claim 1, wherein the first recess is shaped so as to define a channel for the passage of air between the reservoir and the interior of the first recess.

10. The evaporator according to claim 1, wherein an opening in an upper surface of the cover defines a chimney through which the volatile liquid, after evaporation from the wick by operation of the heater, exits the evaporator as a volatized material, the chimney being surmounted by a raised rim which extends above the upper surface of the cover.

11. The evaporator of claim 1 wherein the plurality of guide members orients the wick to be received within the heater.

12. An evaporator comprising:
    a reservoir containing a volatile liquid and having a wick with a lower portion in contact with the volatile liquid and an upper portion protruding from the reservoir, the reservoir having a plurality of guide members disposed around the wick;
    a base having a first electrical contact and a first recess having complementary features to the reservoir that orients the reservoir and the plurality of guide members relative to the first electrical contact; and
    a cover having a heater with a central aperture, a plurality of guide recesses, and a second electrical contact, the cover configured to engage the base when complementary features of the reservoir and the first recess align the plurality of guide members to be received within the plurality of guide recesses, whereupon a functional electrical connection between the first and second electrical contacts is established to power the heater and the wick is oriented within the heater central aperture.

13. The evaporator of claim 12 wherein when the reservoir is misaligned within the first recess, the plurality of guide members are prevented from being received within the plurality of guide recesses and the functional electrical connection is prevented.

14. The evaporator of claim 12 wherein the complementary features of the first recess and the reservoir are engaged prior to the cover engaging the base.

* * * * *